(12) United States Patent  (10) Patent No.: US 6,197,424 B1
Morrison et al.  (45) Date of Patent: Mar. 6, 2001

(54) USE OF HIGH TEMPERATURE INSULATION FOR CERAMIC MATRIX COMPOSITES IN GAS TURBINES

(75) Inventors: Jay Alan Morrison, Orlando, FL (US); Gary Brian Merrill, Pittsburgh, PA (US); Evan McNeil Ludeman, New Boston, NH (US); Jay Edgar Lane, Murrysville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/049,369

(22) Filed: Mar. 27, 1998

(51) Int. Cl.$^7$ .................................. B32B 5/16; B32B 9/00
(52) U.S. Cl. .......................... 428/402; 428/469; 428/472; 416/241 R; 416/241 B
(58) Field of Search ..................................... 428/402, 469, 428/472, 701, 937; 148/537; 106/691; 415/170.1, 171.1, 173.1, 200; 416/241 R, 241 B; 501/80

(56) References Cited

U.S. PATENT DOCUMENTS

| 3,053,694 | 9/1962 | Daunt et al. .............................. 117/95 |
| 3,975,165 | 8/1976 | Elbert et al. .......................... 29/182.2 |
| 4,177,308 | 12/1979 | Beeler . |
| 4,247,249 | 1/1981 | Siemers .................................. 415/174 |
| 4,269,903 | 5/1981 | Clingman et al. .................... 428/591 |
| 4,374,173 | 2/1983 | Adamovic .............................. 428/325 |
| 4,405,284 | 9/1983 | Albrecht et al. ...................... 415/174 |
| 4,521,496 | 6/1985 | Sara ....................................... 428/551 |
| 4,639,388 | 1/1987 | Ainsworth et al. ................... 428/117 |
| 4,690,763 | 9/1987 | Rieger et al. . |
| 4,704,332 | 11/1987 | Brennan et al. ....................... 428/428 |
| 4,867,639 | 9/1989 | Strangman ......................... 415/173.4 |
| 5,064,727 | 11/1991 | Naik et al. ............................ 428/593 |
| 5,320,909 | 6/1994 | Scharman et al. ..................... 428/472 |
| 5,434,210 | 7/1995 | Rangaswamy et al. ............. 524/406 |
| 5,472,315 | 12/1995 | Alexander et al. ................ 415/173.4 |
| 5,780,146 | * 7/1998 | Mason et al. .......................... 428/402 |
| 5,962,076 | * 7/1998 | Mason et al. ....................... 427/376.2 |

FOREIGN PATENT DOCUMENTS

| 0 751 104 | 1/1997 | (EP) . |
| 1 525 037A | 9/1978 | (GB) . |
| 2130244A | 5/1984 | (GB) . |

* cited by examiner

Primary Examiner—Timothy M. Speer
Assistant Examiner—Bryant Young
(74) Attorney, Agent, or Firm—Eckert Seamans Cherin & Mellott, LLC

(57) ABSTRACT

A ceramic composition for insulating components, made of ceramic matrix composites, of gas turbines is provided. The composition comprises a plurality of hollow oxide-based spheres of various dimensions, a phosphate binder, and at least one oxide filler powder, whereby the phosphate binder partially fills gaps between the spheres and the filler powders. The spheres are situated in the phosphate binder and the filler powders such that each sphere is in contact with at least one other sphere and the arrangement of spheres is such that the composition is dimensionally stable and chemically stable at a temperature of approximately 1600° C. A stationary vane of a gas turbine comprising the composition of the present invention bonded to the outer surface of the vane is provided. A combustor comprising the composition bonded to the inner surface of the combustor is provided. A transition duct comprising the insulating coating bonded to the inner surface of the transition is provided. Because of abradable properties of the composition, a gas turbine blade tip seal comprising the composition also is provided. The composition is bonded to the inside surface of a shroud so that a blade tip carves grooves in the composition so as to create a customized seal for the turbine blade tip.

20 Claims, 6 Drawing Sheets

USE OF HIGH TEMPERATURE INSULATION FOR CERAMIC MATRIX COMPOSITES IN GAS TURBINES

ACKNOWLEDGEMENT OF GOVERNMENT SUPPORT

This invention was made with government support under Contract No. DE-FC21-95MC32267, awarded by DOE. The government has certain rights in this invention.

FIELD OF THE INVENTION

The present invention relates generally to high temperature insulation for ceramic matrix composites, and more particularly to its application in gas turbines.

BACKGROUND OF THE INVENTION

Combustion turbines comprise a casing or cylinder for housing a compressor section, combustion section and turbine section. The compressor section comprises an inlet end and a discharge end. The combustion section or combustor comprises an inlet end and a combustor transition. The combustor transition is proximate the discharge end of the combustion section and comprises a wall which defines a flow channel which directs the working fluid into the turbine section's inlet end.

A supply of air is compressed in the compressor section and directed into the combustion section. Fuel enters the combustion section by means of a nozzle. The compressed air enters the combustion inlet and is mixed with the fuel. The air/fuel mixture is then combusted to produce high temperature and high pressure gas. This working gas is then ejected past the combustor transition and injected into the turbine section to run the turbine.

The turbine section comprises rows of vanes which direct the working gas to the airfoil portions of the turbine blades. The working gas flows through the turbine section causing the turbine blades to rotate, thereby turning the rotor, which is connected to a generator for producing electricity.

As those skilled in the art are aware, the maximum power output of a combustion turbine is achieved by heating the gas flowing through the combustion section to as high a temperature as is feasible. The hot gas, however, heats the various turbine components, such as the combustor, transition ducts, vanes and ring segments, that it passes when flowing through the turbine.

Accordingly, the ability to increase the combustion firing temperature is limited by the ability of the turbine components to withstand increased temperatures. Consequently, various cooling methods have been developed to cool turbine hot parts. These methods include open-loop air cooling techniques and closed-loop cooling systems. Both techniques, however, require significant design complexity, have considerable installation and operating costs and often carry attendant losses in turbine efficiency.

In addition, various insulation materials have been developed to strengthen the resistance of turbine critical components to increased temperature. Thermal Barrier Coatings (TBCs) are commonly used to protect critical components from premature breakdown due to increased temperatures to which the components are exposed. Generally, TBCs extend the life of critical components by reducing the rate of metal waste (through spalling) by oxidation.

In Advanced Turbine Systems (ATSs), however, the temperature demands of operation and the limits of ATS state-of-the-art materials, often lead to failure of the TBCs. This, in turn, results in premature failure of the critical components and therefore, failure of the turbine, interruption in the power supply and expensive repair costs. It is, therefore, desirable to provide turbine components that can withstand high temperatures without the use of thermal barrier coatings and reduce the need for cooling.

Commercially available ceramic matrix composites (CMCs) have many potential applications in gas turbines, but are limited in their exposure to temperatures near 1200° C. for long periods of time, i.e., greater than 10,000 hours for gas turbines used in power generation. In addition, CMCs cannot be effectively cooled under high temperature conditions (>1400° C.) or high heat flux conditions due to their relatively low thermal conductivity and inability to fabricate intricate cooling passages.

Combustion of the fuel/air mixture occurs at temperatures much higher than the melting point of the metallic combustor liner. For this reason, the liners must be cooled by non-combusted, cooler air and are usually coated with thermal barrier coatings. The most common way of cooling metallic liners is by way of film cooling, which introduces cool air through the wall of the liner by way of small holes drilled at an acute angle to the surface. This air, in turn, forms a cooler boundary layer on the inside surface of the combustor liner, protecting it from the hot combustion gases. One of the problems with film cooling is that undesirable combustion byproducts (carbon monoxide (CO) and unburned hydrocarbons (UHC)) occur when the cooler air mixes with the hot gases. In anticipation of dilution due to film cooling, the fuel/air mixture is consequently richer than desirable, resulting in excessive $NO_x$ emissions. A true hot wall combustor requires no film cooling (resulting in lower CO and UHC emissions), allows leaner combustion (resulting in lower $NO_x$ emissions), and provides increased flame stability (resulting in greater durability and reliability).

The transition duct is a large, complex structure which contains the hot combustion gases and directs them into the turbine inlet. The large surface area and the high internal temperature make these parts extremely difficult to cool effectively. Conventional transitions are made from Nickel-based superalloys coated internally with thermal barrier coatings. The latest high efficiency utility engines necessitate that these parts be actively cooled, requiring internal wall cooling passages, and complex and costly construction. With much simpler construction, lower cost components would be possible using an insulated CMC concept. Passive cooling methods could be employed using redirected combustor inlet gases, resulting in net efficiency gains.

The first stage of turbine vanes direct the combustion exhaust gases to the airfoil portions of the first row of rotating turbine blades. These vanes are subjected to high velocity, high temperature gases under high pressure conditions. In addition, these are complex parts with high surface areas and, therefore, are difficult to cool to acceptable temperatures. Conventional state-of-the-art first row turbine vanes are fabricated from single-crystal superalloy castings with intricate cooling passages and with external thermal barrier coatings applied. Not only are these components expensive to manufacture, but with ever-increasing gas path temperatures, their ability to be effectively cooled is limited. Higher temperature materials would obviate the need for such complexity, thus minimizing cost, and also minimizing the need for cooling air, thereby improving engine efficiency and reducing operating costs.

The rotating turbine or rotor of an axial flow gas turbine consists of a plurality of blades attached to a rotor disk. In operation, the shaft and blades rotate inside a shroud. Preferably, the inner surface of the inner wall of the shroud is coated with an abradable material. The initial placement of the rotor blades are such that the blade tips are as close as possible to the coating.

Materials which abrade readily in a controlled fashion are used in a variety of applications. One such material is disclosed in European Patent Office publication No. 007,511,04, entitled "An Abradable Composition," filed Jan. 2, 1997, which is incorporated herein by reference in its entirety. Contact between a rotating part and a fixed abradable seal causes the abradable material to wear in a configuration which closely mates with and conforms to the moving part at the region of contact. The moving part wears away a portion of the abradable seal so that the seal assumes a geometry which precisely fits the moving part, i.e., a close clearance gap. This effectively forms a seal having an extremely close tolerance.

As appreciated by those skilled in the art, it is important to reduce leakage in axial flow gas turbines to maximize turbine efficiency. This is achieved by minimizing the clearance between the blade tips and the inner wall of the shroud. As the turbine blades rotate, however, they expand slightly due to the heat generated by the turbine. The tips of the rotating blades then contact the abradable material and carve precisely-defined grooves in the coating without contacting the shroud itself. These grooves provide for the blades to rotate, resulting in a customized seal for the turbine blades. It is, therefore, desirable to provide an abradable material that abrades relatively easily without wearing down the blade tips.

Abradable materials are also used for high temperature insulation. Abradability is usually achieved by altering the density of the material by introducing microscopic porosity. The consequence of this, however, is a reduction in the erosion resistance of the abradable coating. Alternatively, coatings can be fabricated with higher densities for acceptable erosion resistance. This, in turn, sacrifices abradability, necessitating the use abrasive blade tip treatments. Relatively low thermal conductivity and relatively high erosion resistance are two properties of abradable materials required for high temperature insulation. These characteristics are especially important in an ATS environment, where temperatures can approach 1600° C. It is, therefore, desirable to provide an abradable material that has relatively low thermal conductivity and relatively high erosion resistance, particularly at elevated temperatures.

European Patent Office publication No. 007,511,04 discloses a ceramic abradable material that can be used to seal ceramic turbine components. This material, however, purportedly has a high temperature capability of only 1300° C., not suitable for use in ATS turbines. It is, therefore, desirable to provide a ceramic abradable material that can be used in ATS turbines, where temperatures can approach 1600° C.

SUMMARY OF THE INVENTION

A ceramic composition for applications in gas turbines, such as insulating components made of ceramic matrix composites, is provided. The applications make use of the unique qualities of the ceramic material, namely its insulating properties, high temperature stability, erosion resistance, abradability, and suitability for bonding to ceramic matrix composites. Each application makes use of the ceramic material in unique and innovative ways. The material is particularly suited to be able to meet the specific needs of and desired benefits for particular components of a gas turbine.

The composition comprises a plurality of hollow oxide-based spheres of various dimensions, a phosphate binder, and at least one oxide filler powder, whereby the phosphate binder partially fills gaps between the spheres and the filler powders. The spheres are situated in the phosphate binder and the filler powders such that each sphere is in contact with at least one other sphere and the arrangement of spheres is such that the composition is dimensionally stable and chemically stable at a temperature of approximately 1600° C.

A stationary vane of a gas turbine comprising the composition of the present invention bonded to the outer surface of the vane is provided. The vane uses the composition to serve as an insulating coating. Depending on the conditions, the thickness of the coating on a particular vane is varied to account for variations in internal cooling and external heating patterns. The design of the vane according to the present invention is intended to achieve minimum cooling while maintaining acceptable stresses.

A combustor comprising the insulating coating bonded to the inner surface of the combustor to serve as a combustor liner is provided. The design of the hybrid structure of the combustor is intended to achieve maximum inner surface temperature to stabilize combustion and minimize unwanted emissions.

A transition duct comprising the insulating coating bonded to the inner surface of the transition is provided. The coating serves as an insulating barrier so that hot combustion exhaust gases are in contact only with the insulating coating.

The composition of the present invention is also abradable for sealing blade tips of a gas turbine. A gas turbine blade tip seal is provided, which comprises a turbine blade tip, an inner surface of a shroud within which the blade tip rotates, and the composition of the present invention. The composition is bonded to the inside surface of the shroud so that the blade tip carves grooves in the composition so as to create a customized seal for the turbine blade tip. For each blade tip seal, the shroud of the turbine is made of ceramic matrix composites.

DETAILED DESCRIPTION OF THE PREFERRED EMBODIMENTS

Figure 1:
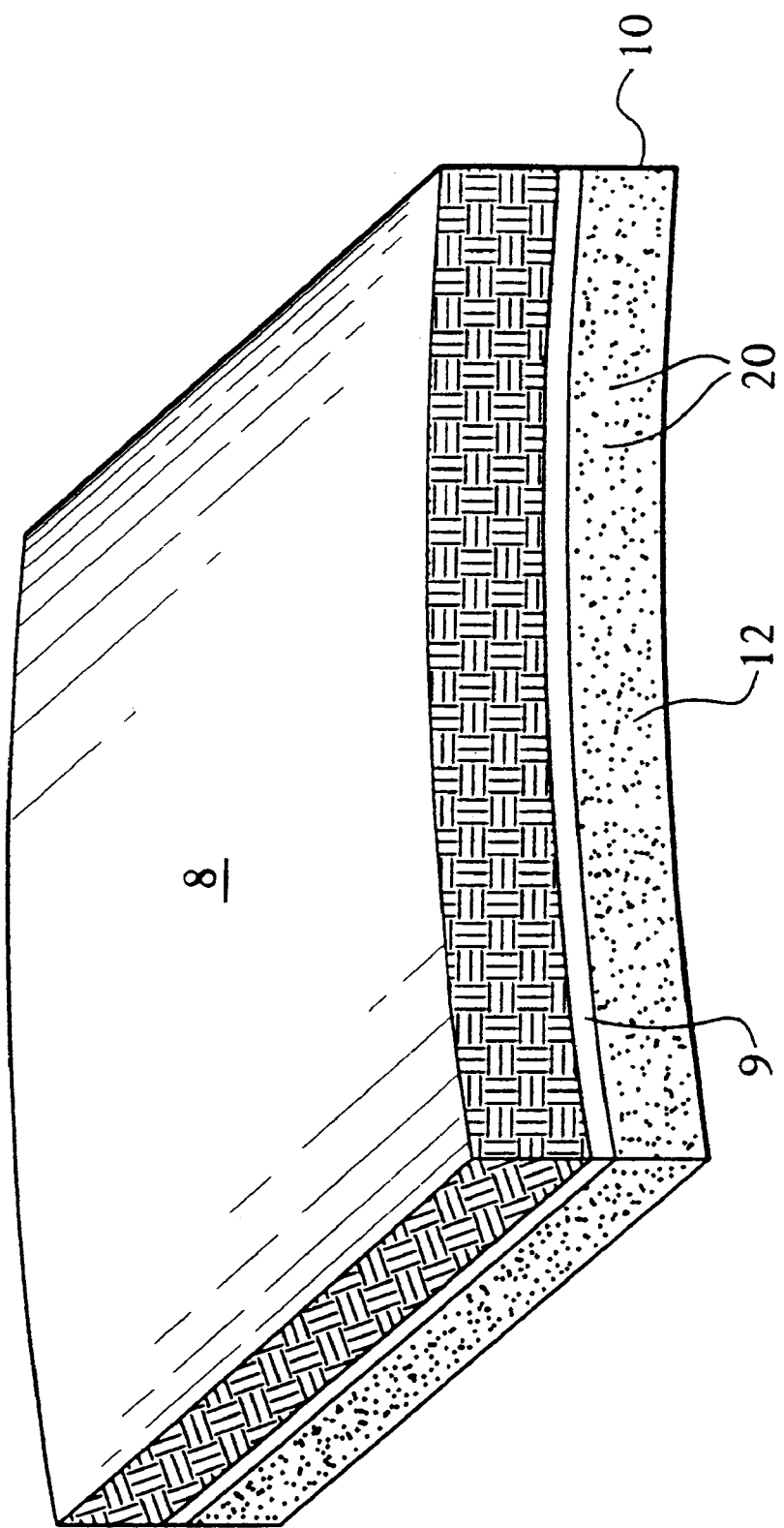
FIG. 1 is an enlarged perspective view of a preferred embodiment of ceramic coating according to the present invention.

The present invention provides a material composition that uses high temperature ceramic material as an insulator over a higher strength, lower temperature ceramic matrix composite for application to high temperature environments. Referring to the drawings, there is shown in FIG. 1 an enlarged perspective view of a preferred embodiment of ceramic abradable/insulating composition 10 (or coating 10)

according to the present invention. This view also shows a cross section of ceramic insulating coating 10 placed on a substrate 8 of ceramic matrix composite and kept in place with a layer of adhesive 9.

Figure 2:
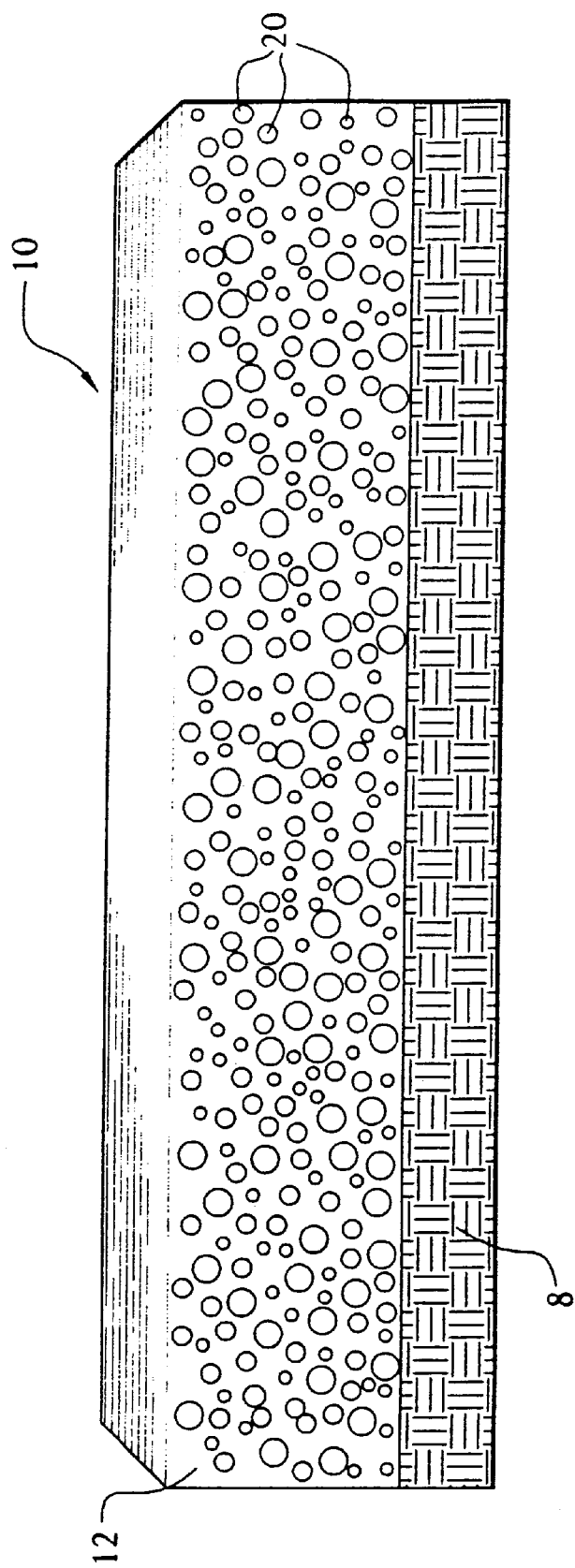
FIG. 2 is a further enlarged perspective view, depicting a cross section, of a preferred embodiment of ceramic coating according to the present invention.

FIG. 2 shows a further enlarged perspective view, depicting the cross section, of a preferred embodiment of ceramic abradable coating 10 according to the present invention. The coating 10 comprises hollow oxide-based spheres 20 of various dimensions in a combination 12 of a phosphate binder and various oxide filler powders. The phosphate binder "bridges" the gaps between the spheres 20 and the oxide filler powders. The spheres 20 are manufactured at high enough temperatures to make them stable at 1600° C., depending on the particular composition of the coating 10.

Firing temperatures up to 1600° C. are used to create the coating, which is dimensionally stable, chemically stable and erosion resistant.

Dimensional stability is primarily controlled by the spheres 20. The coating 10 achieves improved erosion resistance by introducing closed porosity on a macroscopic scale with a relatively dense arrangement of spheres 20. Preferably, the spheres 20 are arranged so that each sphere 20 is in contact with at least one other sphere 20. More preferably, the spheres 20 are arranged so that each sphere 20 is in contact with several other spheres 20, i.e., at least 3 or 4 spheres 20. This provides the improved dimensional stability, especially at elevated temperatures near 1600° C. Sphere contact such as that present in the coating 10 and the resulting dimensional stability is not achieved by prior art coatings.

Oxide filler powders in combination with the phosphate binder can be varied to control properties of the coating 10. Specific coating systems may be formulated to cover a range of coefficients of thermal expansion (CTE). As understood by those of skill in the art, the CTE of the coating 10 must be as close as practically possible to the CTE of the substrate 8 for the coating 10 to remain in place on the substrate 8. Various properties of exemplary coatings 10, A and B, are shown in Table 1.

TABLE 1

| | Material | |
|---|---|---|
| | A | B |
| Use Temp (° C.) | 1200 | 1600 |
| CTE (× $10^{-6}$ mm/mm ° C.) | 5.85 | 5.85 |
| Thermal Conductivity (W/mK) at 1400° C. | 1.27 | 2.21 |
| Erosion Resistance* (g/kg) at 1100° C. | 7.5 | 4.5 |

*Tested at 15° impingement angle, 900 ft/s erodent speed.

Material properties such as thermal conductivity and erosion resistance can be tailored by specific selection of filler materials or sphere compositions. The hollow oxide-based spheres 20 of the coating material of the present invention can be made of either Mullite, Alumina, stabilized Zirconia (usually Yttria stabilized Zirconia) or any combination thereof. The preferred range of diameters of the Mullite spheres is approximately 0.4 to approximately 1.8 mm, and more preferably approximately 0.8 to approximately 1.4 mm. The preferred range of diameters of the Alumina spheres is approximately 0.3 to approximately 1 mm. The preferred range of diameters of the stabilized Zirconia spheres is approximately 0.6 to approximately 1.2 mm, and more preferably approximately 0.8 to approximately 1 mm.

When only Mullite spheres are used, i.e., KCM Holospheres® manufactured by Keith Ceramics, Inc. of Great Britain, the preferable weight percentage of spheres 20 in the coating 10 is 32%±10%, more preferably 32%±5%, and even more preferably approximately 32%. When only Alumina spheres are used, i.e., manufactured by Ceramic Fillers, Inc. of Atlanta, Ga., the preferable weight percentage of spheres 20 in the coating 10 is 63%±15%, more preferably 63%±10%, even more preferably 63%±5%, and most preferably approximately 63%. When only stabilized Zirconia spheres are used, i.e., manufactured by Keith Ceramics, Inc., the preferable weight percentage of spheres 20 in the coating 10 is 58%±15%, more preferably 58%±10%, even more preferably 58%±5%, and most preferably approximately 58%.

Tailoring a particular coating to obtain a particular CTE to "match" the CTE of the intended substrate 8, is achieved by varying the combination of spheres 20. For example, monolithic stabilized Zirconia spheres have the highest CTE (approximately $10 \times 10^{-6}$ mm/mm° C.), monolithic Mullite spheres have the lowest (approximately $5.7 \times 10^{-6}$ mm/mm° C.), and monolithic Alumina spheres have an intermediate value (approximately $8.0 \times 10^{-6}$ mm/mm° C.)

A preferred combination of spheres 20 is 20% Mullite and 80% Alumina by volume. As displayed in Table 2, this sphere composition yields a % linear change of 0.5972, which "matches" a value of 0.5934 for Composite A (an oxide-based CMC material) and a value of 0.6031 for composite B. For Composite C (a high silica containing oxide-based composite material), an all mullite sphere composition is preferred.

TABLE 2

| Sphere Composition | Volumetric Ratio | % Linear Change at 1000° C. | Oxide/Oxide Substrate Composition (% Linear Change at 1000° C.) |
|---|---|---|---|
| Mullite | 100 | 0.5657 | 0.5631 (C) |
| Mullite and Stabilized Zirconia | 50/50 | 0.5660 | |
| Mullite and Alumina | 50/50 | 0.5763 | |
| Mullite and Alumina | 20/80 | 0.5972 | 0.5934 (A) and 0.6031 (B) |
| Mullite and Alumina | 10/90 | 0.6210 | |
| Mullite and Alumina | 5/95 | 0.6337 | |
| Alumina | 100 | 0.6380 | |
| Stabilized Zirconia | 100 | 0.7325 | |

The oxide filler powders can be Alumina, Mullite, Ceria, Hafnia or any combination thereof. Preferably, Alumina or Mullite is used as the filler powder, and most preferably, Mullite is used because of its superior high temperature properties. Preferably, when Mullite is used, the weight percentage of the oxide filler powder in the coating 10 is 32%±15%, more preferably 32%±10%, even more preferably 32%±5%, and most preferably approximately 32%. The preferred weight percentages of the oxide filler powders vary because of the different atomic mass and particle size of each.

Preferably, the phosphate binder is Aluminum Ortho-Phosphate in a weight percentage of 31%±15%, more preferably 31%±10%, even more preferably 31%±5%, and most preferably approximately 31%. Preferably, a combination of Aluminum Ortho-Phosphate binder and Mullite filler powder has a viscosity of approximately 9,000 centipoise, measured with a Brookfield® RV viscometer having a spindle No. of 7 and a rpm of 20.

The manufacturing process for the coating 10 of the present invention comprises the following steps: (1) mixing a slurry, (2) casting the slurry, (3) controlled drying, (4) removal of the "green" body, (5) firing, and (6) machining. The mixture is formulated such that the end product possesses a CTE practically identical to that of the CMC substrate 8.

The process starts with the mixing of raw materials to form a viscous slurry and is accomplished in two stages. First, Aluminum Ortho-Phosphate and the filler powder is mixed to an exact formulation of 50% aqueous solution of Aluminum Ortho-Phosphate and is stored air-tight (with a shelf life of up to 2 months). Alter-natively, one can start with a 50% aqueous solution of Aluminum Ortho-Phosphate.

When a casting is performed, exact amounts of hollow spheres 20 are added to the slurry and the slurry mixture is then cast within approximately 24 hours of being made. The slurry containing the hollow spheres 20 is cast into pre-soaked molds. The molds are presoaked with deionized water prior to casting to allow the capillary drying of the casting to be effective. If the slurry was cast into a dry mold, water from the cast would be extracted too quickly into the mold creating a dry surface on the casting preventing further controlled drying from occurring. This would result in an non-homogenous end product. At a critical stage in the drying of the castings, the viscosity is sufficiently high for the "green" bodies to be extracted from the molds with minimal dimensional distortion ("green" body is the term used for the composition prior to firing).

After removal from the mold, the "green" bodies are carefully transferred to a drying oven (at approximately 80° C.). In a preferred procedure, before drying, the "green" bodies are shaped to conform to the contour of a mating substrate surface. This step will achieve near net shaping capability. After drying, the "green" bodies are then transferred to the firing oven. During firing, a slow heating rate is used with a dwell at approximately 250° C. which ensures that all of the free water is removed by this stage.

Between approximately 250° C. and approximately 565° C., steady dehydration of the phosphate commences and this is controlled by a slow heating rate through this temperature range. The rest of the firing cycle is dedicated to chemical changes in the phosphate structure. Incorrect procedure for removing water from this material system will result in a defective and weak microstructure.

The molds are recycled after the "green" bodies have been removed. This is achieved by washing out the leached phosphate with running water followed by oven drying. When fully dry, the dry weight of the mold must be within approximately 1% of the original dry weight in order for the mold to be used again. It can be expected to reuse a mold up to 12 times.

In preparation for firing, the "green" bodies can be stacked which minimizes furnace space. The resulting simplified firing cycle is shown in Table 3.

TABLE 3

| Step Number | Start Temp (° C.) | Ramp Rate (° C./min) | Hold Temp (° C.) | Dwell Time (mins) |
|---|---|---|---|---|
| 1 | 80 | 1 | 250 | 60 |
| 2 | 250 | 3 | 1600 | 240 |
| 3 | 1600 | 10 | ambient | END |

The final phase of the manufacturing process is to machine the insulating coating 10.

At temperatures up to approximately 750° C. the phosphate binder may exist in a glassy form, which is compliant during the firing process. This may provide the potential for shape forming during the first firing. By firing the material up to temperatures of approximately 1200° C., a phosphate "bridge" is produced that gives a compliant matrix that can be used as a displacement type abradable seal.

By heat treating further to approximately 1600° C., the phosphate "bridge" network that connects the constituents of the material system (the particles and spheres) is significantly modified to form more localized and densified phosphate agglomerations within the microstructure. A material system with new properties results from this change that retains up to 80% of its room temperature strength at 1400° C., has similar thermal conductivity and excellent erosion resistance (approximately a factor of 2 times better than currently available TBC systems used on metallic substrates)

The material is fired stand alone and then ground to shape prior to bonding to the substrate 8. The adhesive 9 will vary according to the substrate 8. Direct coating onto the substrate 8, however, is also possible utilizing the substrate 8 and/or in-situ curing in the application environment.

Figure 3:
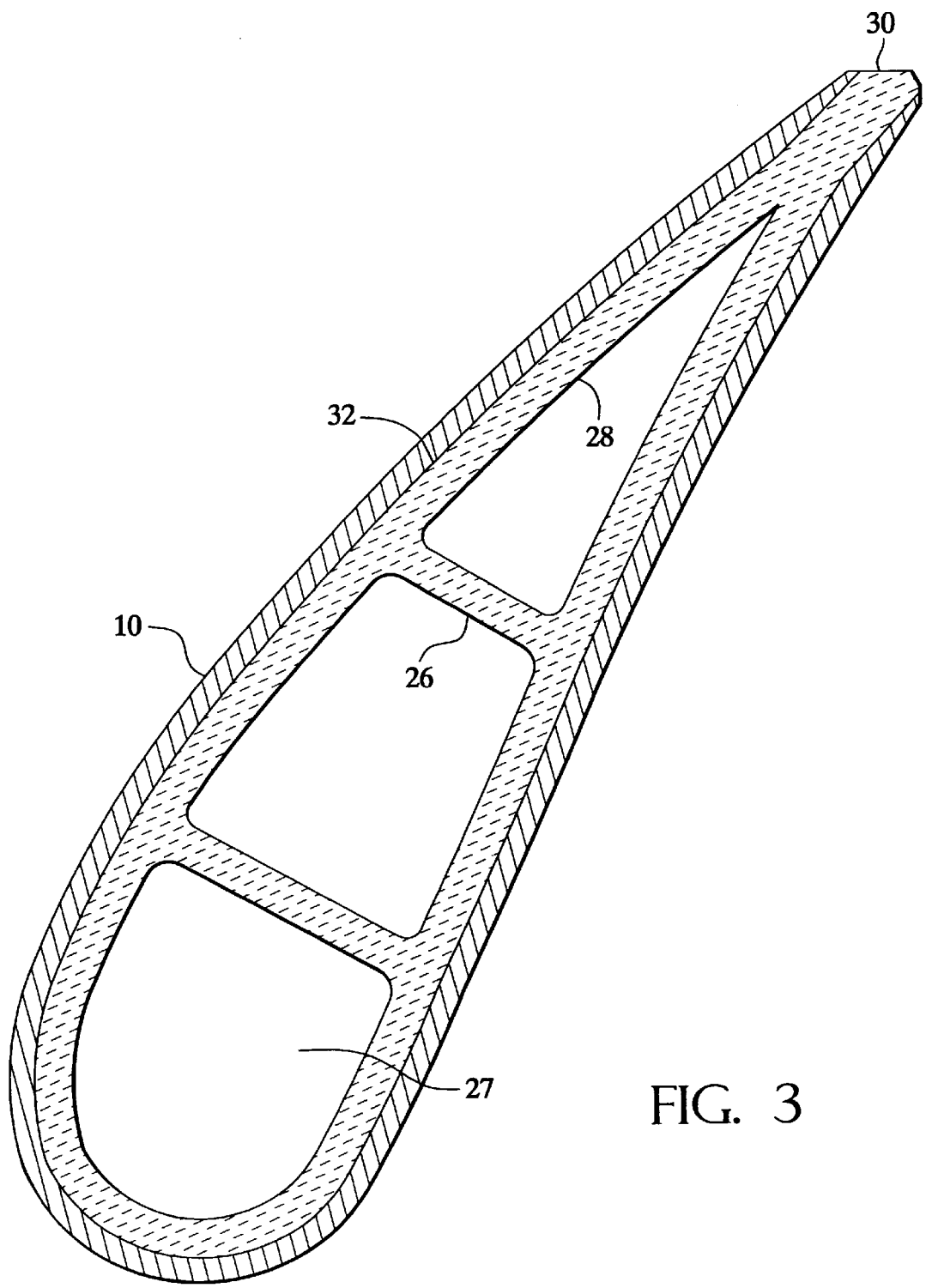
FIG. 3 is a cross-sectional view of a stationary vane with an ceramic coating of the present invention.

Potential applications for the ceramic insulating coating 10 of the present invention are vast. One application is to insulate a stationary vane of a gas turbine. FIG. 3 shows a cross-sectional view of a stationary vane 30 with a coating 10 of the present invention. The vane 30 has an inner surface 28 and an outer surface 32, upon which the coating 10 is bonded. In a preferred embodiment, the stationary vane 30 further comprises an adhesive 9 for bonding the composition 10 to the outer surface 32.

The vane 30, as well as other turbine components utilizing the composition 10 of the present invention, can be made from any variety of CMCs capable of surviving in oxidizing atmospheres at moderate temperatures (around 1200° C.) under moderate stress (up to 100 MPA). Such materials include, but are not limited to, oxide matrix composites (e.g., Mullite, Aluminosilicate and Alumina), Silicon Carbide matrix composites (made by techniques such as chemical vapor infiltration or melt-infiltration), Silicon Nitride matrix composites (made by means such as reaction bonding, nitriding, hot pressing or pressureless sintering).

Application of the coating 10 is performed by forming the coating 10 separately and subsequently bonding the coating 10 to the substrate 8 using Aluminum Phosphate-based adhesives cured at intermediate temperatures, i.e., around 800° C.–1200° C. Coatings of mullite or alumina may be applied to the substrate 8 prior to bonding to prevent fiber damage during curing and/or to facilitate the bonding process. These coatings are especially desirable when bonding to non-oxide substrates 8. In most preferred embodiments of the present invention, the coating 10 is applied in its "green" (uncured) state to the surface of the composite and co-cured with the composite in-situ.

Construction of the vane 30 need not be customized for application of the coatings 10 and includes any airfoil cross-section with or without integral platforms (external to the airfoil), and with or without internal stiffening ribs 26.

The thermal conductivity of the ceramic insulation 10 of the present invention ranges from 1–2 W/mK depending upon the specific composition of spheres and filler powders, their relative amounts, and the final firing temperature used. The coating 10 is used in thicknesses greater than 1 mm, preferably 2–6 mm, and more preferably 2–3 mm. Cooling of the inner wall 28 of the vane 30 is achieved by convection, e.g., via direct impingement through supply baffles situated in the interior chambers 27 of the vane 30, using air directed from the compressor exit.

Use of the coating 10 dramatically reduces the amount of cooling air required to cool a stationary vane 30 in a gas turbine. In a preferred embodiment, the vane 30 consists of a 2 mm thick insulating coating 10 with a 4 mm thick CMC wall. Table 4 provides a one-dimensional comparison of this preferred embodiment in a high temperature (1600° C.) engine environment with a state-of-the-art, thin-walled, metallic vane with a conventional thermal barrier coating. In this example, while the maximum substrate temperature is at 1200° C., the maximum coating temperature is 1579° C. in a high temperature environment of 1600° C.

TABLE 4

| Property | TBC-Coated Metallic Vane (current technology) | Insulated CMC Vane (present invention) |
| --- | --- | --- |
| Coating thickness | 0.3 mm | 2 mm |
| Coating thermal conductivity | 1.0 W/mK | 1.0 W/mK |
| Substrate thickness | 1.5 mm | 4 mm |
| Substrate thermal conductivity | 20 W/mK | 4.0 W/mK |
| Maximum Coating Temperature | 1411° C. | 1579° C. |
| Maximum Substrate Temperature | 900° C. | 1200° C. |
| Heat Flux | 1.7 MW/m$^2$ | 190 kW/m$^2$ |
| Substrate Thermal Stress | 200 MPa | 62 MPa |
| Cooling Flow Required | 100% | 5% |

Figure 4:
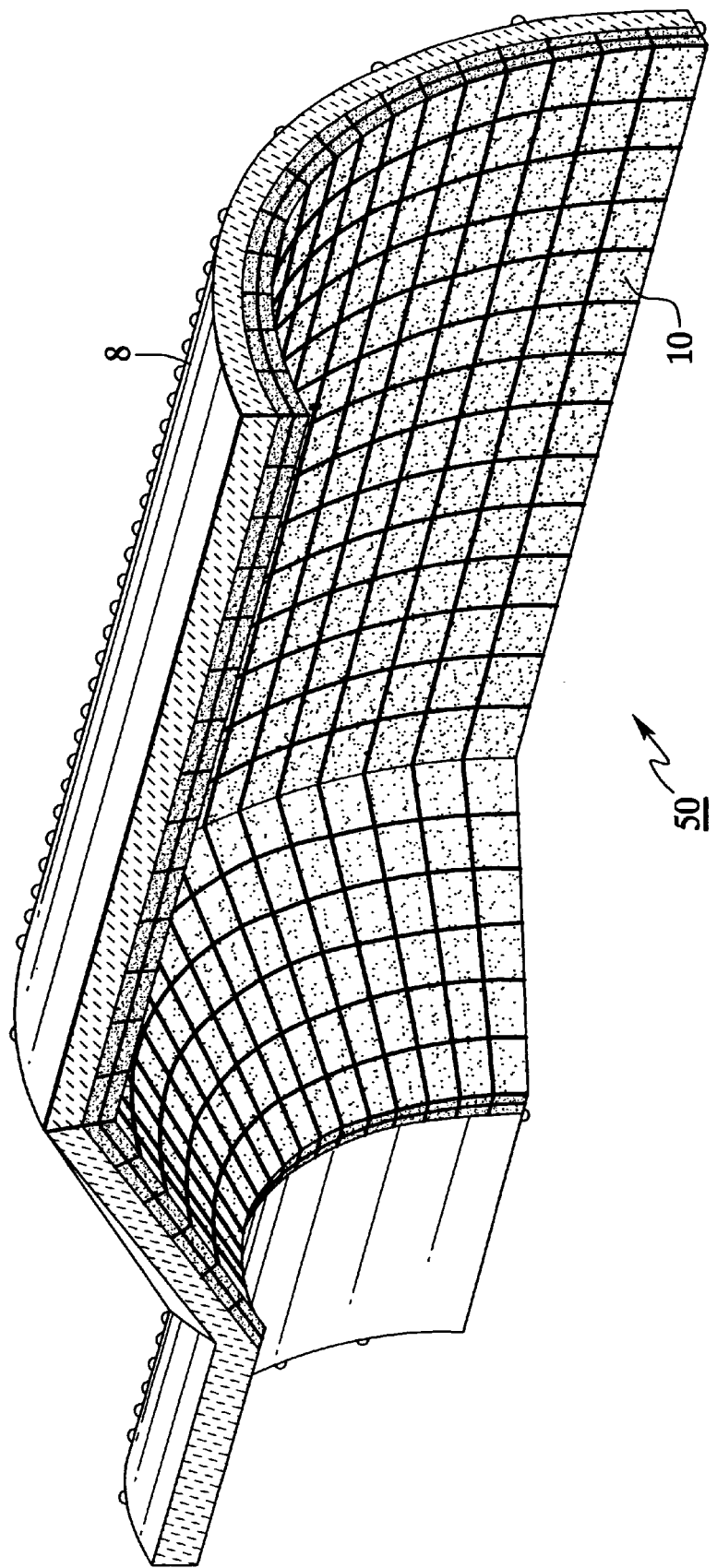
FIG. 4 is a perspective cut-away view of a combustor made with a ceramic coating of the present invention.

A combustor 50 made with the coating 10 of the present invention is shown in FIG. 4. The combustor 50 is an axially-symmetric component comprised of the insulating coating 10 of the present invention, serving as a combustor liner, bonded to the inner surface of an outer structural member of CMC 8. The combustor 50 may or may not comprise integral flanges, attachment points, conical sections or other geometric features. In a preferred embodiment of the present invention, the combustor 50 further comprises an adhesive 9 for bonding the composition 10 to the inner surface of the combustor 50 (or cylinder). In most preferred embodiments, the insulating coating 10 is deposited in its "green" state directly onto the uncured ceramic composite 8 and the two are co-cured. The design of the hybrid structure of the combustor 50 is intended to achieve maximum inner surface temperature to stabilize combustion and minimize unwanted emissions.

The insulation 10 can be formed or deposited in varying thicknesses to control the temperatures and thermal stresses of the system. In the example depicted in FIG. 4, the insulation 10 is graded in thickness along the axial length of the combustor to coincide with the combustion flame position and internal temperature profile. The ability of the insulating coating 10 to withstand temperatures near 1600° C. means that hot-wall combustion can occur, allowing leaner combustion mixtures, lower overall combustion temperatures, and consequently lower NOx emissions.

Furthermore, such hot wall construction can be achieved without film cooling, thus less flame quenching at the walls, resulting in lower emissions of carbon monoxide and unburned hydrocarbons. Cooling requirements in comparison to state-of-the-art metallic components for the combustor 50 will be similar to that shown for the vane in Table 4.

Figure 5:
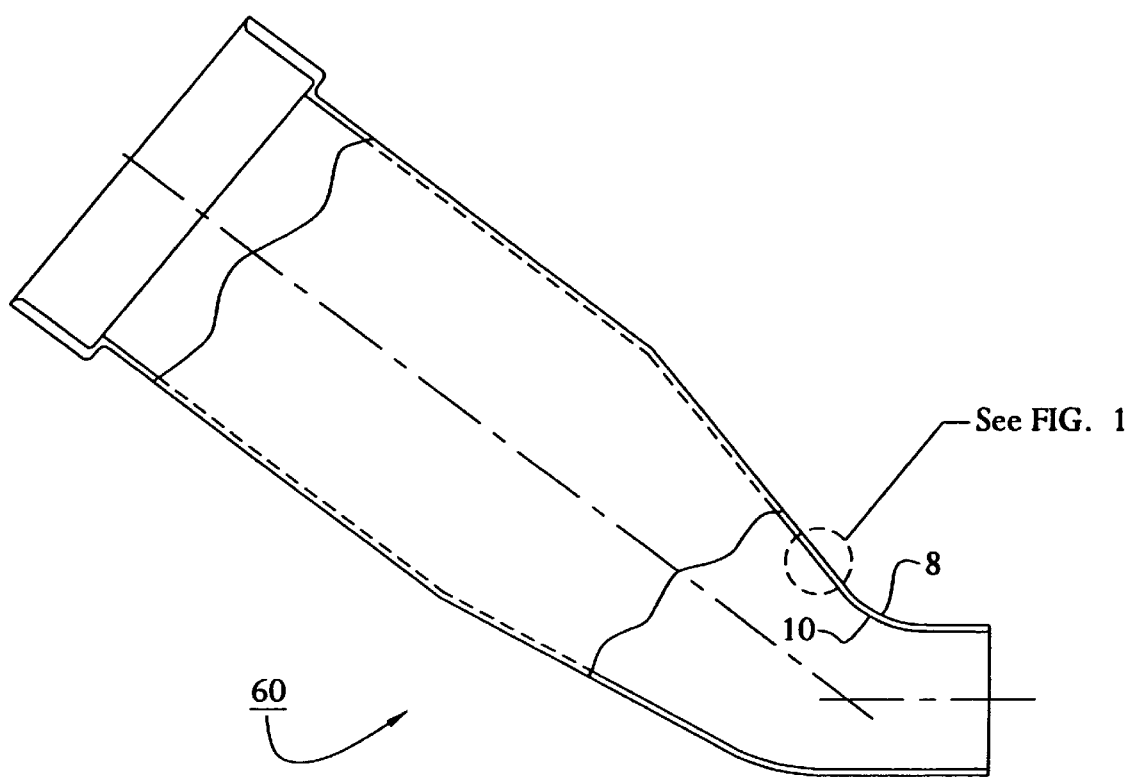
FIG. 5 is a side view of a combustor transition duct having a ceramic coating of the present invention.

A combustor transition duct 60 (or transition) having an insulating coating 10 of the present invention is shown in FIG. 5. The transition 60 comprises insulating coating 10 bonded to the inside surface of an outer structural member of ceramic matrix composite 8 such that hot combustion exhaust gases are in contact only with the insulating coating 10. In a preferred embodiment, the transition 60 further comprises an adhesive 9 for bonding the composition 10 to the inner surface of the transition 60. In most preferred embodiments, the coating 10 is applied in its "green" state to the inner surface of the transition 60 and co-cured with the composite in-situ.

The ability of the insulating member to withstand temperatures near 1600° C. means that passive cooling methods can be employed, resulting in lower cost components and increased engine efficiency. The insulating coating 10 thickness is varied around the component to account for variations in cooling patterns from the passive cooling, thus maintaining uniform temperatures of the structural component and minimizing stresses. Higher wall temperatures allowed by the hybrid construction of the transition 60 also contribute to reduced emissions of carbon monoxide and unburned hydrocarbons. Reduction in cooling flows relative to conventional metallic designs for the transition 60 of the present invention are similar to that shown in Table 4 for the vane 30.

Figure 6:
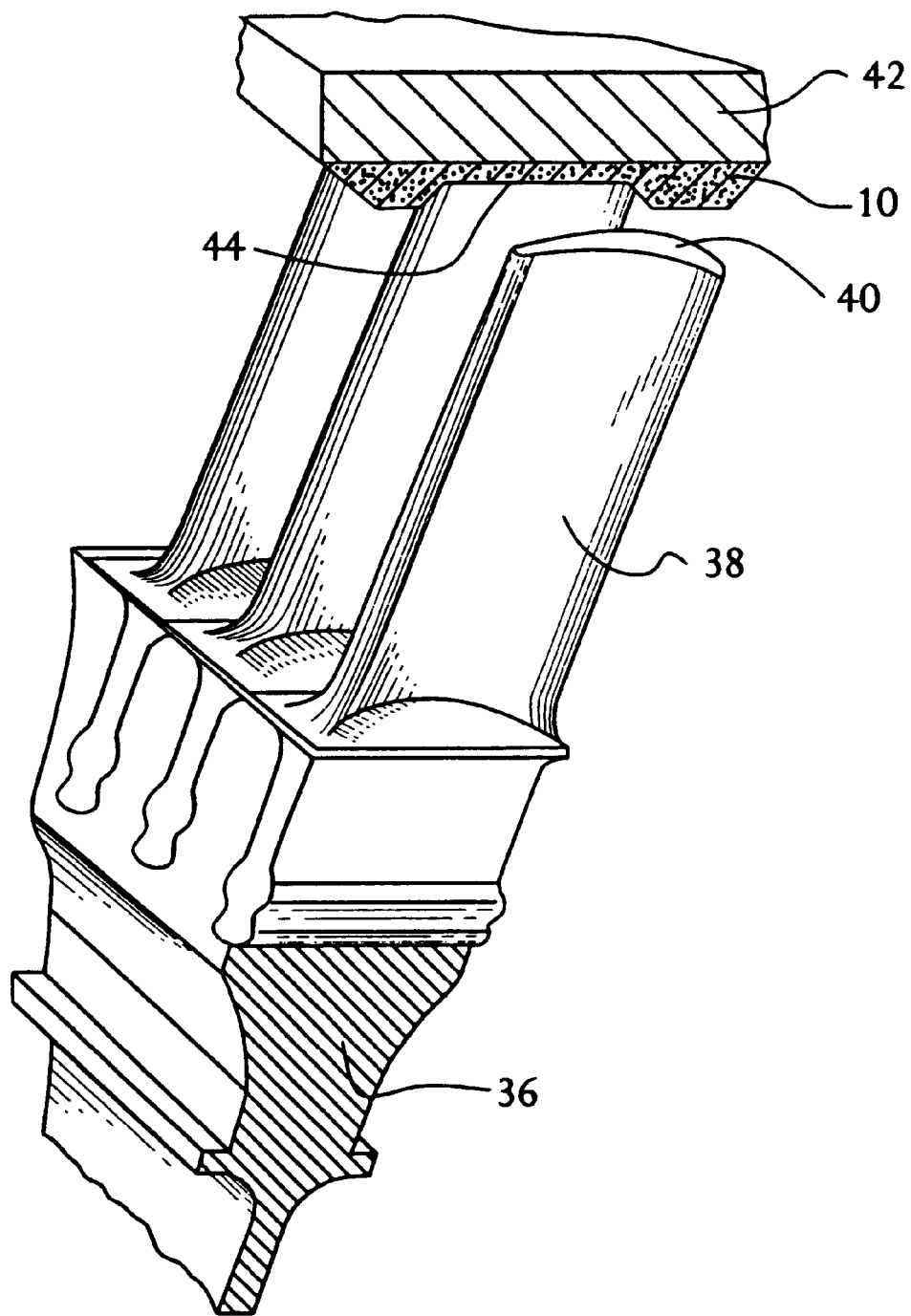
FIG. 6 is a perspective view of a turbine blade tip sealing mechanism.

Because of the abradable properties of the composition, another application of the coating 10 of the present invention is to seal a blade tip of a gas turbine. FIG. 6 shows a perspective view of the blade tip sealing mechanism. Turbine blades 38 are mounted on a rotor disk 36. The blade tip 40 is located just inside the inner wall 42 of the turbine shroud, upon which the ceramic abradable coating 10 is bonded. During operation, the tips 40 of the rotating blades 38 contact the abradable coating 10 and carve precisely-defined grooves 44 in the coating 10 without contacting the shroud itself.

Just as with insulation for the stationary vane 30, the shroud can be made from any variety of CMCs capable of surviving in oxidizing atmospheres at moderate temperatures, i.e., slightly greater than or equal to 1200° C., under moderate stress (approximately 100 MPa). Similarly, application of the coating 10 is performed in the same manner as is performed for application on a stationary vane 30. In a preferred embodiment, the blade tip seal further comprises an adhesive 9 for bonding the composition 10 to the inner surface 42 of the shroud. In most preferred embodiments, the coating 10 is applied in its "green" state to the inner surface 42 of the shroud and co-cured with the composite 10 in-situ.

In addition, the construction or shape of the inner wall 42 of the shroud need not be customized for application of the coating 10 of the present invention. Preferably, a typical inner wall 42 having a thickness of 8 mm utilizes a 3 mm thick coating 10. Use of the coating 10 not only provides a seal for the turbine blade tip 40 with its abradability, but provides insulation for the inner wall 42 of the ceramic shroud at elevated temperatures such as 1600° C.

Use of the coating 10 dramatically reduces the amount of cooling required to cool gas turbine components such as a stationary vane 30. Thus, the coating 10 of the present invention provides insulation for gas turbine components made of moderate temperature ceramic matrix composites so that the components can withstand temperatures near 1600° C. without the use of thermal barrier coatings and reduces the need for cooling methods. A composition 10 according of the present invention is stable preferably at temperatures greater than approximately 1300° C., and more preferably at temperatures up to approximately 1600° C. A composition 10 according to the present invention stable at temperatures greater than approximately 1600° C. is possible.

It is to be understood that even though numerous characteristics and advantages of the present invention have been set forth in the foregoing description, together with details of the structure and function of the invention, the disclosure is illustrative only. Accordingly, changes may be made in detail, especially in matters of shape, size and arrangement of parts within the principles of the invention to the full extent indicated by the broad general meaning of the terms in which the appended claims are expressed.

What is claimed is:

1. A dimensionally stable ceramic insulating composition for insulating components of a gas turbine made of ceramic matrix composites, the composition comprising:
   a plurality of hollow oxide-based spheres of various dimensions;
   a phosphate binder; and
   at least one oxide filler powder, whereby said phosphate binder partially fills gaps between said spheres and said at least one filler powder;
   said spheres being situated in said phosphate binder and said at least one filler powder such that each sphere is in contact with several other spheres, said composition being stable at temperatures up to approximately 1600° C.

2. A dimensionally stable ceramic abradable composition for sealing blade tips of a gas turbine made of ceramic matrix composites, wherein the blade tips rotate within a shroud of the turbine, the shroud being made of ceramic matrix composites, the composition comprising:
   a plurality of hollow oxide-based spheres of various dimensions;
   a phosphate binder; and
   at least one oxide filler powder, whereby said phosphate binder partially fills gaps between said spheres and said at least one filler powder;
   said spheres being situated in said phosphate binder and said at least one filler powder such that each sphere is in contact with several other spheres, said composition being stable at temperatures up to approximately 1600° C.

3. A stationary vane of a gas turbine, the vane made of ceramic matrix composites, having an outer surface exposed to hot gas flow of the turbine, and comprising the composition of claim 1 bonded to the outer surface of said vane.

4. The stationary vane of claim 3, wherein the vane without the composition has a temperature capability of approximately 1200° C. and the vane with the composition is stable at a maximum coating temperature greater than 1300° C.

5. The stationary vane of claim 4, further comprising an adhesive for bonding the composition to said outer surface of said vane.

6. A combustor of a gas turbine, the combustor made of ceramic matrix composites, having a combustion flame, having an outer surface exposed to the combustion flame, and comprising the composition of claim 1 bonded to the inner surface of said combustor.

7. The combustor of claim 6, wherein the combustor without the composition has a temperature capability of approximately 1200° C. and the combustor with the composition is stable at a maximum coating temperature up to approximately 1600° C.

8. The combustor of claim 7, further comprising an adhesive for bonding the composition to said inner surface of said combustor.

9. A transition duct of a gas turbine, the transition duct made of ceramic matrix composites, having an inner surface exposed to combustor exhaust gases, and comprising the composition of claim 1 bonded to the inner surface of said transition duct.

10. The transition duct of claim 9, wherein the transition duct without the composition has a temperature capability of approximately 1200° C. and the transition duct with the composition is stable at a maximum coating temperature up to approximately 1600° C.

11. The transition duct of claim 10 further comprising an adhesive for bonding the composition to said inner surface of said transition duct.

12. A gas turbine blade tip seal comprising:
   a turbine blade tip;
   an inner surface of a shroud within which said blade tip rotates, the shroud being made of ceramic matrix composites; and
   the composition of claim 2 bonded to said inside surface of the shroud so that said blade tip carves grooves in the composition so as to create a customized seal for the turbine blade tip.

13. The blade tip seal of claim 12, wherein the shroud without the composition has a temperature capability of approximately 1200° C. and the shroud with the composition is stable at a maximum coating temperature up to approximately 1600° C.

14. The blade tip seal of claim 13 further comprising an adhesive for bonding the composition to said inner surface of said shroud.

15. The composition of claim 1, wherein the size and weight percentage of the spheres are effective such that each sphere is in contact with at least three other spheres.

16. The composition of claim 1, wherein the size and weight percentage of the spheres are effective such that each sphere is in contact with at least four other spheres.

17. The composition of claim 1, having a coefficient of thermal expansion close to that of the ceramic matrix composites.

18. The composition of claim 2, wherein the size and weight percentage of the spheres are effective such that each sphere is in contact with at least three other spheres.

19. The composition of claim 2, wherein the size and weight percentage of the spheres are effective such that each sphere is in contact with at least four other spheres.

20. The composition of claim 2, having a coefficient of thermal expansion close to that of the ceramic matrix composites.

* * * * *